United States Patent [19]
Thielecke et al.

[11] Patent Number: 5,719,899
[45] Date of Patent: Feb. 17, 1998

[54] MULTIPLE ACCESS DIGITAL TRANSMISSION SYSTEM AND A RADIO BASE STATION AND A RECEIVER FOR USE IN SUCH A SYSTEM

[75] Inventors: Jorn Thielecke, Erlangen; Wolfgang Granzow, Nürnberg, both of Germany

[73] Assignee: U.S. Philips Corporation, New York, N.Y.

[21] Appl. No.: 535,209

[22] PCT Filed: Feb. 23, 1995

[86] PCT No.: PCT/IB95/00115

§ 371 Date: Nov. 22, 1995

§ 102(e) Date: Nov. 22, 1995

[87] PCT Pub. No.: WO95/24086

PCT Pub. Date: Sep. 8, 1995

[30] Foreign Application Priority Data

Feb. 25, 1994 [EP] European Pat. Off. ............ 94200479

[51] Int. Cl.⁶ .................................................. H04B 15/00
[52] U.S. Cl. .......................... 375/206; 375/343; 375/349; 370/320; 370/342; 370/479; 455/52.3; 455/65
[58] Field of Search ........................... 375/200–210, 375/316, 346–351; 370/310, 479, 317, 319–321, 464, 342; 455/52.1, 52.3, 54.1, 63, 65

[56] References Cited

U.S. PATENT DOCUMENTS

| 5,081,643 | 1/1992 | Schilling ........................ 375/1 |
| 5,465,276 | 11/1995 | Larsson et al. ............... 375/345 |
| 5,544,156 | 8/1996 | Teder et al. .................. 370/342 |
| 5,550,810 | 8/1996 | Monogioudis et al. ........ 370/342 |

FOREIGN PATENT DOCUMENTS

| 0493904 | 7/1992 | European Pat. Off. ......... H04B 7/26 |
| 9428642 | 12/1994 | WIPO ....................... H04B 7/216 |

OTHER PUBLICATIONS

Thielecke, "A State Space Multiuser Detector for CDMA Systems", IEEE Int. Conference on Comm., ICC '93, Geneva, Switzerland, May 23–26, 1993, vol. 3, pp. 1762–1767.

*Primary Examiner*—Stephen Chin
*Assistant Examiner*—Amanda T. Le
*Attorney, Agent, or Firm*—Arthur G. Schaier

[57] ABSTRACT

A multiple access digital transmission system including a transmitter for transmitting at least one modulated data stream, and at least one receiver for receiving, via a multipath transmission channel, a transmitted signal which includes the modulated data streams. The receiver includes a resolver for resolving at least one path for at least one multipath received modulated data stream and a channel estimator for estimating channel path delays in the received modulated data streams. The receiver includes a generator for generating an interference reduced signal from the received signal, the interference reduced signal being fed to the channel estimator.

11 Claims, 6 Drawing Sheets

MULTIPLE ACCESS DIGITAL TRANSMISSION SYSTEM AND A RADIO BASE STATION AND A RECEIVER FOR USE IN SUCH A SYSTEM

BACKGROUND OF THE INVENTION

1. Field of the Invention

The present invention relates to a multiple access digital transmission system comprising at least one transmitter for transmitting at least one modulated datastream, and at least one receiver for receiving a transmitted signal, which comprises the modulated datastreams, via a transmission channel, the receiver comprising receiving means having resolving means for resolving at least one path for at least one multipath received modulated datastream, and having channel estimation means, which are coupled to the resolving means, for estimating channel path delays in the received modulated datastreams. Such a transmission system can be a mobile radio multiple access system based upon direct-sequence spread spectrum techniques or the like, or other transmission systems using similar techniques.

The present invention further relates to a radio base station and to a receiver for use in such a system.

2. Description of the Related Art

Spread spectrum systems are well-known since long and have been described in numerous articles and handbooks, such as in a basic article describing a system implementing a direct-sequence spread spectrum system, "A Communication Technique for Multipath Channels", R. Price et at., Proc. of the IRE Vol. 46, March 1958, pp. 555-570, a tutorial article "Theory of Spread-Spectrum Communications—A Tutorial", R. L. Pickholtz et at, IEEE Tr. on Comm., Vol. COM-30, No. 5, May 1982, pp. 855-884, and a handbook "Digital Communications", J. Proakis, McGraw-Hill, 1989, Chapters 7 and 8. In Chapter 7, pp. 702-799 of said handbook digital signalling over fading multipath channels is described as is the case in a mobile radio system, in Chapter 7, pp. 719-739 a so-called RAKE receiver is described implementing diversity for multipath spread spectrum receivers, and in Chapter 8 spread-spectrum receivers, especially pp. 802-804, describing direct-sequence spread spectrum, pp. 831-836 describing PN sequences for DS SS, pp. 862-864, describing a sync acquisition phase for DS SS, and pp. 868-872, describing sync tracking for DS SS. In this respect it is to be noticed that synchronisation of a DS SS receiver to a DS SS transmitter has to be very accurate, i.e. within a fraction of a so-called chip in the tracking phase. In practical systems, the acquisition and tracking phases may not be quite distinguishable.

From the U.S. Pat. No. 5,099,493 a DS-SS (Direct Sequence-Spread Spectrum) Receiver is known with separate integrated signal estimator-and-demodulator arrangements for processing DS-SS channels. A common error signal is formed as the difference between the received signal and the sum of reconstructed signals estimated by the estimator-and-demodulator units. Each reconstructed signal is also fed back to the input of the corresponding estimator-and-demodulator unit. This approach does not exploit efficiently the fact that the channel parameters vary slowly as compared to the bit period. Due to the immediate feedback the channel estimates are sub-optimal Furthermore, the U.S. Pat. No. 5,099,493 is not directed to multipath signal path resolving, and the shown analog COSTAS-loops are not particularly suitable for digital receivers.

A multiple access digital transmission system of the above kind is known from the European Patent No. 0 361 299. In said patent a multiple access direct-sequence spread spectrum system or CDMA (Code Division Multiple Access) mobile radio system is disclosed. In such a mobile radio system the transmission channel between mobile radio station and a base station, having a multipath behaviour, is apt to give fadings due to the fact that such a multipath behaviour is time variant. I.e., signals arriving at the base station via various paths of different phase shifts and different length and thus giving rise to different path delays may cancel each other almost completely. In order to counter such situations, the system disclosed in said patent applies wide band signals and channel estimation for estimating channel path delays of a number of strong paths or rays per user. More generally, in a multipath broad band channel systems in some form frequency selective fading occurs. In a small band system such frequency selective fading would present itself as so-called flat fading as a result of which total signal suppression could occur, a so-called deep fading. Such a deep fading could, to some extent, be counter-acted by applying coding and interleaving, but, better, by increasing the signal bandwidth whereby such flat fading is perceived as frequency selective fading. Then, paths in the multipath channel can be resolved by path delay estimation. The estimated path delays are applied to a so-called L-tap RAKE demodulator as disclosed in FIG. 8, blocks 15 and 19 of said patent. The channel estimation of the path delays is carried out in blocks 15, 17 and 18 of said FIG. 8. In said patent, for finding L paths, N parallel correlators are applied, and N time shifted versions or replica of the same generated pseudo-noise reference sequence used for despreading, L and N being integers. In case N has a very large value, the correlator bank behaves like a so-called matched filter. In said patent, the tasks of demodulation, path delay estimation, and amplitude estimation as the case may be, are solved by averaging techniques only, i.e. by applying correlators with a sufficiently large correlation gain. On the one hand, the correlation length may not be too small, because of an acceptable suppression of inter-user and inter-path interference, i.e. interference between users or between rays of the same user, has to be achieved, and on the other hand, the correlation length may not be too long because of the fact that, in case of a mobile radio channel for instance, the mobile radio channel is time variant. The system according to said patent, though suppressing inter-user and inter-path interference to an acceptable extent, does not take into account inter-user interference, i.e. rays of other users causing interference with rays of the current user. Resolved paths with different delays also cause noise-like interferences with demodulation. All in all, a situation can occur in which weak users cannot be detected. This problem is aggravated in mobile radio systems where the so-called near-far problem might arise, i.e. given that near and far users transmit with equal power, the signal from the near user will arrive at the receiver in question with a much larger power than that of the far user. This might form so severe a problem that DS CDMA cannot be used, at least not without very sophisticated power control.

SUMMARY OF THE INVENTION

It is an object of the present invention to provide a multiple access digital access system of the above kind which takes into account both inter-path and inter-user interference.

To this end the multiple access digital transmission system according to the present invention is characterized in that the receiving means comprises generating means for generating an interference reduced signal from the received signal, the interference reduced signal being fed to the channel estimation means. Using the interference reduced signal allows to estimate the channel parameters more accurately. The present invention is based upon the insight that a delay in channel estimation is allowable if the channel parameters vary slowly with respect to the bit period. Such a delay can easily be implemented in a digital system. Inter-user interference is taken into account due to the fact that the interference reduced signal virtually only contains components due to rays (and users, which, in a given case correspond to a datastream) that not have been taken into account. Since the interference in the interference reduced signal due to resolved rays is drastically reduced, not yet resolved weak or new rays can easily be detected. As compared with the prior art in which on the average strongest rays can be detected only, the present invention detects the currently strongest rays. Because a much smaller processing gain will do, the computational complexity of the present invention as compared to the prior art is reduced. Due to the reduced interference the total correlation length can be reduced. This implies that channel delays can be tracked more closely. When applied in a base station of a mobile radio station, it implies improved access because of the fact that acquisition of a user and its path delays occurs faster and more accurate.

In an embodiment of the present invention, the receiving means comprises received signal estimation means for estimating the received signal, and subtracting means for subtracting the estimated signal from the received signal so as to form the interference reduced signal, generation of the interference reduced signal being channel model based. In this way, with an explicit channel model, a very simple and accurate interference reduction is achieved.

In an embodiment of the present invention an amplitude and a phase per resolved path is estimated, the estimated amplitudes and phases being fed to the received signal estimation means. It is achieved that resolved paths can be updated dynamically, current strongest paths being demodulated, and weaker resolved paths being deleted. Due to the achieved interference reduction, the amplitudes and phases can be determined very accurately.

In an embodiment of the present invention the amplitude and the phase is recursively estimated. This implies a simple method giving an accurate estimation, and thus a good estimation of the received signal. Also, a good amplitude and phase estimation can be used with demodulation, thus improving the same.

In an embodiment of the present invention at least two receiving means are cascaded, an input of a succeeding receiving means being coupled to an interference reduced signal output of a preceding receiving means, so as to successively detect stronger and weaker received modulated datastreams. Thus, also weak users can be detected with less demand on power control. This is based on the insight that weak users do not appear in the channel model of the preceding receiving means and do hardly contribute to interference, but on the other hand come to the fore in the succeeding receiving means because in the interference reduced signal of the preceding receiving means the strong users are eliminated only. This also implies that weak users which cannot be detected by prior art systems can be detected in the system according to the present invention, thus leading to an increased system capacity.

In an embodiment of the present invention at transmission side, after spreading, an inverse Fourier transform is applied, and at reception side, before despreading, a Fourier transform is applied. Thus, by combining CDMA with OFDM (orthogonal frequency division multiplexing) an extra degree of freedom in the system according to the present invention is achieved, because, with OFDM, the frequency range can be controlled. I.e., chips in the frequency domain are obtained, which can be distributed over the frequency domain as is favourable for the transmission. At receiver side, the multipath channel is equalized in the frequency domain, then.

BRIEF DESCRIPTION OF THE DRAWING

The present invention will now be described, by way of example, with reference to the accompanying drawings, wherein FIGS. 1A and 1B schematically show a CDMA mobile radio system according to the present invention.

Throughout the figures the same reference numerals are used for the same features. Throughout the description complex variables are given bold-faced.

DETAILED DESCRIPTION OF THE PREFERRED EMBODIMENTS

Figure 1A:
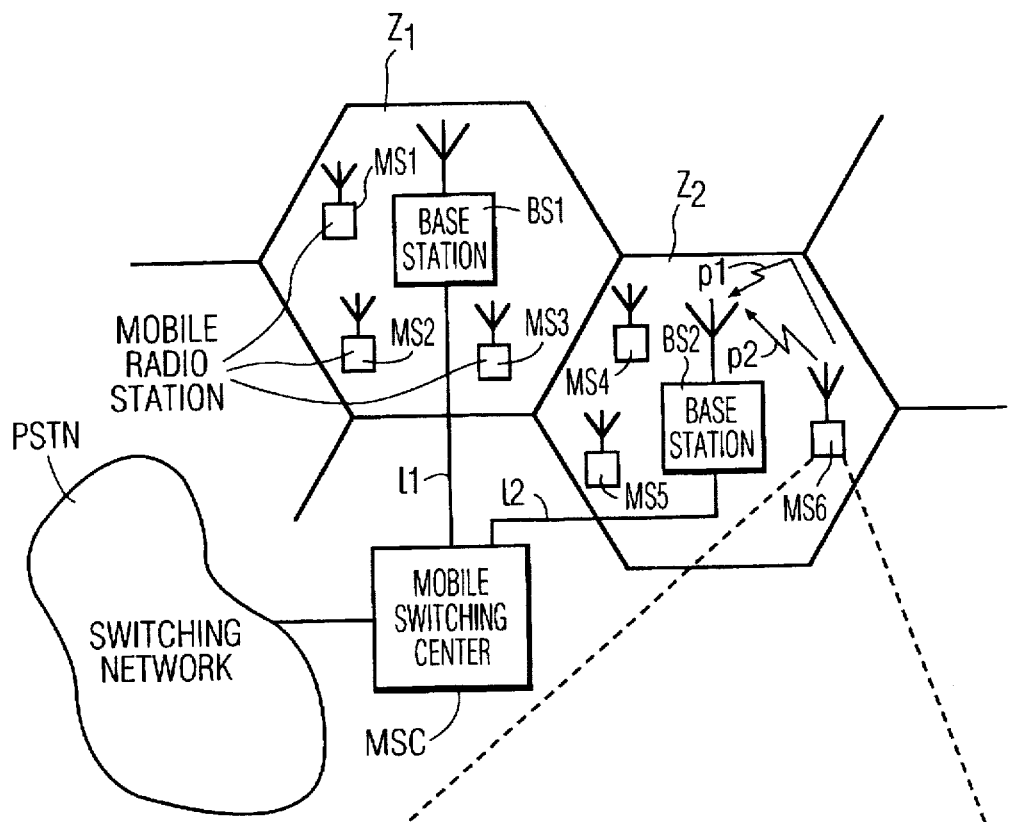
Figure 1B:
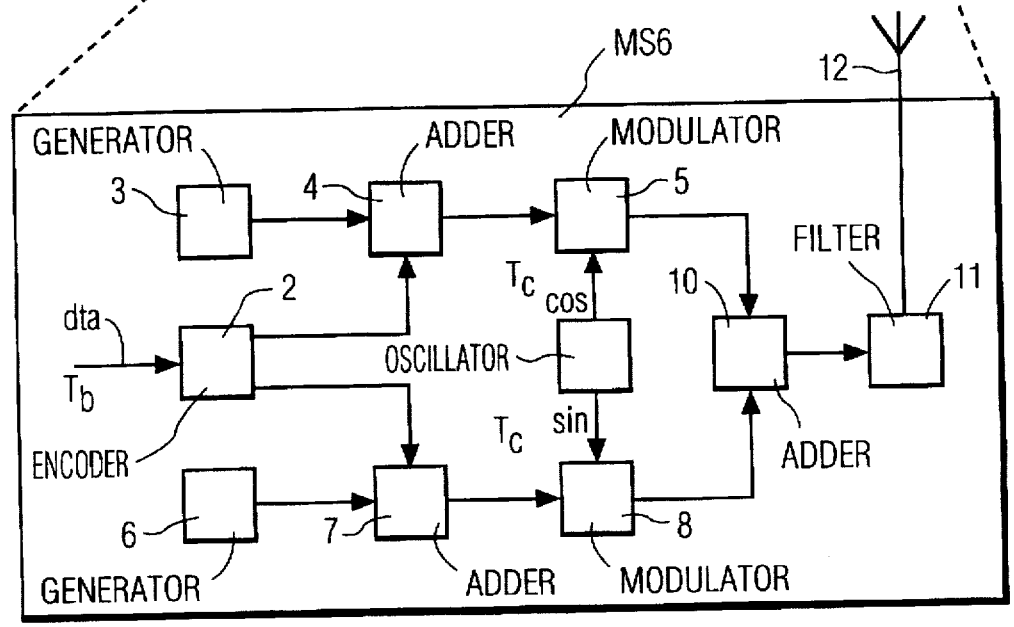

FIGS. 1A and 1B schematically show a cellular CDMA (Code Division Multiple Access) mobile radio system 1 according to the present invention, comprising a number of base stations BS1 and BS2 covering respective radio zones Z1 and Z2. Each radio zone services a number of mobile radio stations MS1, MS2 and MS3, and MS4, MS5, and MS6, respectively. The radio base stations BS1 and BS2 are coupled to a mobile switching centre MSC via landlines 11 and 12. The mobile switching centre is coupled to the public telephone switching network PSTN. The radio base stations are arranged for processing spread spectrum signals transmitted by the mobiles, i.e. for processing uplink spread spectrum signals. Also the mobiles can be arranged to process spread spectrum signals from the base stations, i.e. can process downlink spread spectrum signals. Also hybrid systems are possible, e.g. FDMA (frequency division multiple access) transmission in the downlink direction and CDMA transmission in the uplink direction. The radio base stations can even be arranged for processing signals from FDMA operating mobiles and CDMA operating mobiles, or for processing other combinations of signals. In the sequel, operating in CDMA mode according to the present invention will be described. A CDMA radio system is a multiple access system operating according to spread spectrum techniques, i.e. after coding and/or interleaving of datastreams, as the case may be, these datastreams are frequency spread before transmission. At a reception side a received signal is despread, and de-interleaved and/or decoded, as the case may be. The datastreams may originate from a single user such as a mobile radio user, or may be combined datastreams originating from several users. In the given example, DS SS (direct sequence spread spectrum) is applied, whereby a pseudo-random noise sequence is applied to a datastream, e.g. in case of a BPSK (binary phase shift keying) modulated binary datastream, the BPSK modulated datastream and the pseudo-noise sequence are applied to a modulo-two adder, at an output of which a spread datastream occurs. Despreading at receiver side is then achieved by applying the same pseudo noise sequence, which must thus be known in the receiver, to the received signal. The present invention is not limited to BPSK, but other modulation method may be used. For a more detailed description of DS SS, referred is to chapter 8 of said handbook of Proakis. Such a CDMA mobile radio system operates in a multipath environment, i.e. radio signals from a mobile radio station to a radio base station, or vice versa, arrive at the radio base station via a multitude of paths, indicated in FIG. 1A with paths or rays p1 and p2. Furthermore, the radio channel is time-variant. This may result in fadings at the receiver side, due to different phase shifts and path delays of multipath rays and addition thereof at receiver side. According to the present inventions the negative effects of both inter-path and inter-user interference to the detection of a transmitted datastream are at least mitigated. In FIG. 1B the mobile radio station MS6 is shown in more detail as far as the transmitting side is concerned. Data dta to be transmitted are supplied to an encoder 2, e.g. forming (n, k) block codes, i.e. k information bits at a time generate a code of length n. This code is fed to a quadrature spread spectrum modulator so as to obtain a QPSK spread spectrum signal for transmission. The modulator comprises a pseudo-noise sequence generator 3, followed by a modulo-2 adder 4 and a balanced modulator 5 in one branch, and a pseudo-noise generator 6, a modulo-2 adder 7 and a balanced modulator 8 in another branch. Data are transmitted at a rate $1/T_b$, $T_b$ being the bit period. At an output of the modulo-2 adders 4 and 7 so-called chips occur, a chip being a pulse in the pseudo-noise sequence having a smallest period $T_c$. E.g. a spreading factor of 42 complex chips per bit or 84 chips in the I and Q channel together can be used. With a coded bit rate of 24 kbit/s (e.g. speech) this corresponds to a chip rate of 1.008 Mchips/s. Output signals of the balanced modulators 5 and 8, which are also coupled to respective 90° shifted cos and sine outputs of a carrier oscillator 9, are added with an adder 10 and pulse-shaped with a filter 11 before transmission to the base station BS2 via an antenna 12.

Figure 2:
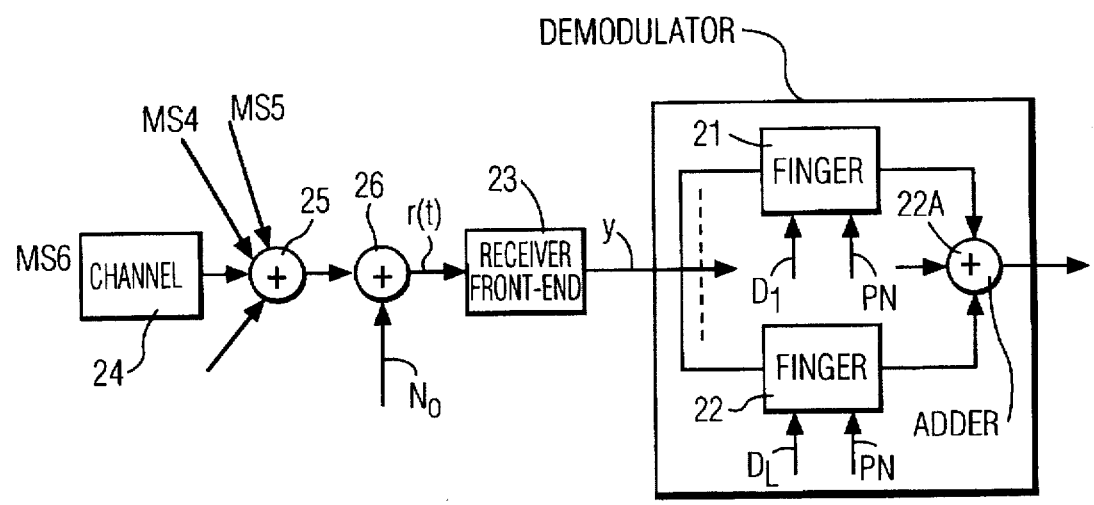
FIG. 2 shows an L-tap RAKE demodulator.

FIG. 2 shows an L-tap RAKE demodulator 20 for a receiver in a mobile station or a radio base station as shown in FIG. 1A, for demodulating a received multipath spread-spectrum signal representing a transmitted datastream, e.g. originating from a single user. The RAKE demodulator 20 comprises L so-called RAKE-fingers 21 and 22, L being an integer, for demodulating a spread-spectrum signal received from a particular mobile radio station, e.g. MS6, via L different paths. Each RAKE-finger provides a preliminary decision variable of a single path. Output signals of the RAKE-fingers 21, 22 are added with an adder 22A so as to form a combined decision variable, which is supplied to a decoder (not shown) for decoding and/or de-interleaving as the case may be. A received quadrature modulated signal r(t) is fed to a known receiver front-end 23 in which it is sampled inter alia with a sample clock having e.g. twice the chip rate so as to form a complex signal y comprising all direct and multipath signals of all received mobiles. The signal y forms an input signal for all RAKE-fingers in the RAKE demodulator 20, for a single mobile. In case the demodulation is carried out in a radio base station, it comprises N parallel RAKE demodulators for demodulating N channels, N being an integer. Each RAKE-finger has an input for a pseudo-noise signal PN and an input for a delay adjustment signal $D_1, \ldots, D_L$, respectively. A vector $D=(D_1, \ldots, D_L)$ denotes a set of L tap delays. For a more detailed description of a RAKE demodulator referred is also to said article of Price. Further shown in FIG. 2 are a channel 24 for the mobile radio station MS6, a received signal of which adds with signals received from other mobiles, e.g. MS4 and MS5, indicated with an addition symbol 25. The received signal r(t) further comprises additive assumed noise $N_0$, indicated with an addition symbol 26.

Figure 3:
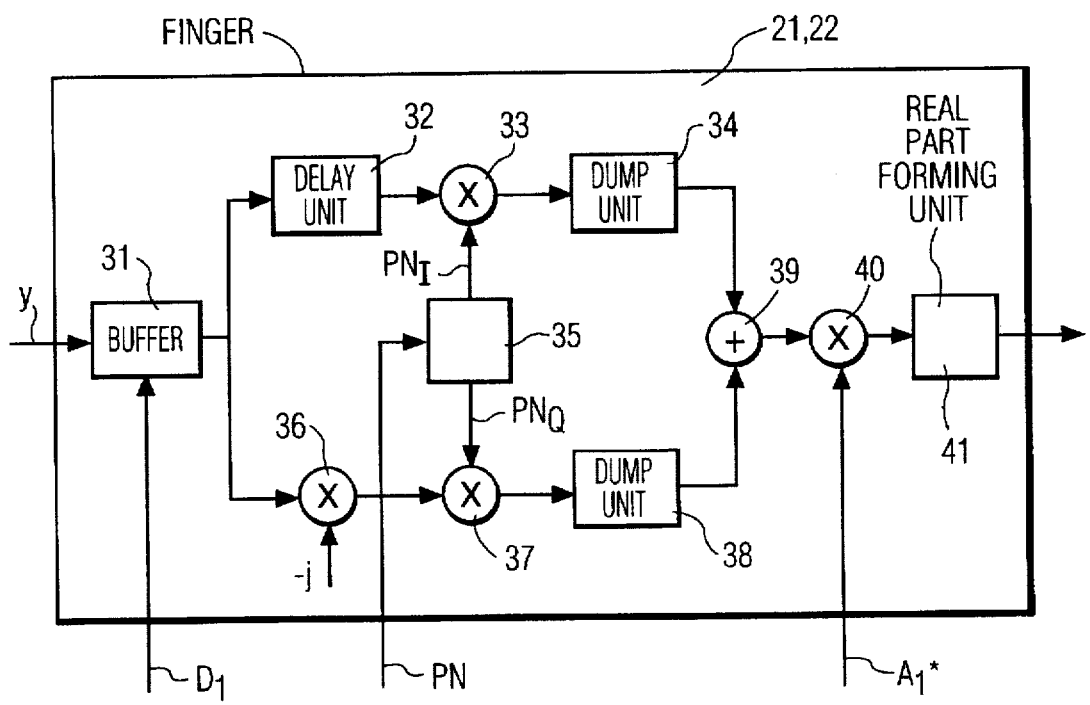
FIG. 3 shows a RAKE-finger for a RAKE demodulator.

FIG. 3 shows a RAKE-finger., e.g. the finger 21, for the RAKE demodulator 20. The finger 21 comprises a variable delay buffer 31 to which the complex signal y is supplied. An output of the delay buffer 31 is fed to two quadrature despreading branches for despreading an in-phase component of a transmitted signal and for despreading a quadrature component of the transmitted signal. The delay buffer 31 delays the path signal comprised in the signal y such that the total delay is constant for all fingers, i.e. with $\tau_i$, i=1, ..., L being the path delays of the L strongest paths, $\tau_i+D_i$ is constant for all i. The delays $D_i$ are referred to as tap delays of the RAKE demodulator 20. The in-phase branch comprises a delay unit 32, which delays over half the chip period $T_c$, and a cross correlator formed by a multiplier 33 and an integrate and dump unit 34. The delay unit 32 is added for offset QPSK. With offset QPSK, the transmitter is less demanding. The complex path signal is cross correlated with an in-phase pseudo-noise sequence $PN_I$, and a quadrature pseudo-noise sequence $PN_Q$, which may originate from the same generator (not shown), whereby the sequences have different initial states, or may originate from different generators (not shown). The quadrature branch comprises a multiplier 36 for multiplying the complex path signal by −j, j=√−1, followed by a cross correlator formed by a multiplier 37 and an integrate and dump unit 38. Outputs of the dump units 34 and 38 are added with an adder 39 of which an output is fed to a multiplier 40. A signal $A_1^*$ is supplied to an input of the multiplier 40, the signal $A_1^*$ being a conjugate of a complex amplitude estimate $A_1$ of the current path, as estimated according to the present invention. The multiplier 40 is followed by a real-part-forming unit 41 which provides the preliminary decision variable. By supplying estimates of complex amplitudes of the time-varying impulse response to the RAKE demodulator 20, coherent detection is achieved. Supplying accurately estimated complex amplitudes to the RAKE-demodulator, as according to the present invention, achieves an improved performance of the RAKE demodulator 20.

Figure 4:
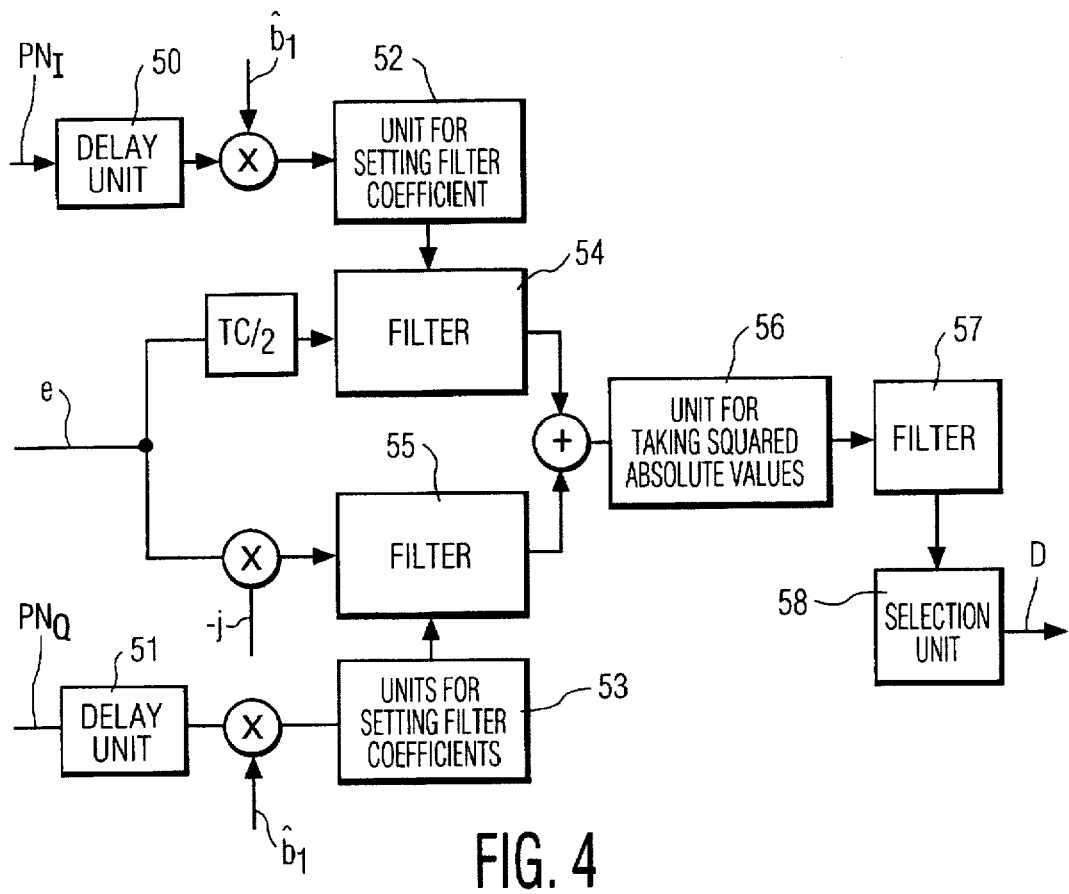
FIG. 4 shows a searcher for estimating path delays.

FIG. 4 shows a searcher for estimating path delays which determines the path delays and herewith the delays D from a short term delay power spectrum of the channel. For N channels to be searched, a bank of N parallel searchers of this kind is provided. The searchers continuously scan the range of possible delays and decide on the presence of a ray. The searchers are correlators that use the spreading sequences together with previous bit decisions in order to provide a correlation gain which is sufficiently large for detection. According to the present invention, the searchers are provided with an error signal e, being the difference between the signal y and an estimate of y. It will be described in the sequel how the error signal or interference reduced signal e is obtained. An embodiment of the searcher will be given. Other suitable searchers will also do, e.g. the searcher as to the cited European patent No. 0 361 299, FIG. 8, blocks 15, 17, and 18 thereof. The searcher comprises constant delay units 50 and 51 to which the in-phase and quadrature sequences $PN_I$ and $PN_Q$ are fed, respectively. The interference reduced signal e is matched filtered with re-modulated and re-spread previous bit decisions $\hat{b}_1$, acquired from decision feedback. The order of the matched filter determines the time window for which the delay power spectrum is estimated. A coefficient vector for matched filtering is updated after each measurement interval, and the delay power spectrum is determined via averaging of several measured impulse responses after squared absolute values are taken. To this end the searcher further comprises units 52 and 53 for setting filter coefficients, time-variant matched filters 54 and 55, a unit 56 for taking squared absolute values, a filter 57 for averaging several short term delay power spectra, if necessary, and a path selection unit 58 for selecting paths from the acquired averaged delay power spectrum.

Figure 5:
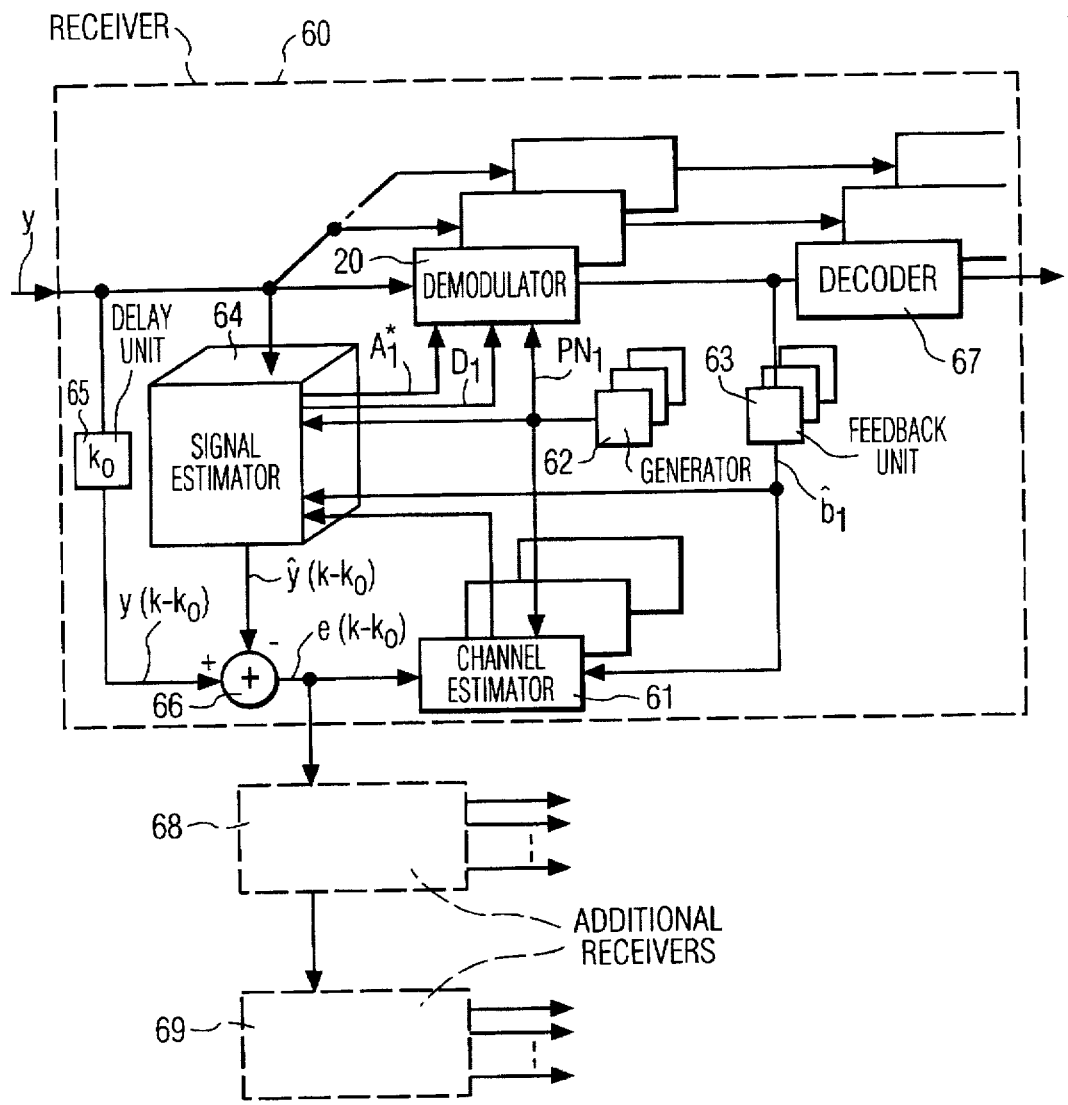
FIG. 5 shows a first embodiment of a CDMA receiver according to the present invention.

FIG. 5 shows a first embodiment of a CDMA receiver 60 according to the present invention. The receiver front end, comprising a channel filter and sampling means inter alia, is not shown in detail. Receiving means 60 for one channel is shown in detail. For indicating that there are N detectors in parallel for N channels to be demodulated, the demodulators not shown in detail are shown in a quasi three-dimensional way of displaying. Block 64 is common to all channels. Channel estimation means 61 for estimating path delays for a multipath channel are provided as described in relation to FIG. 4. The RAKE demodulator 20 for resolving the paths are provided as described in relating to FIG. 2. The receiver further comprises a pseudo-noise generator 62 for providing a pseudo-noise sequence $PN_i$ corresponding to the pseudo-noise sequence of channel one applied at transmitter side, a decision feedback unit 63 for providing a previous bit decision $\hat{b}_1$, and received signal estimation means 64 according to the present invention for generating an estimate $\hat{y}(k-k_0)$ of the received signal y(k) and the interference reduced signal $e(k-K_0)$ to be fed to the searcher 61, k denoting the sampling period. A delay unit 65 is provided for delaying the received signal y by $k_0$, corresponding to a predetermined number of samples. This is due to the decision feedback used, necessary for determining an estimate $\hat{y}$, for y. The delay $k_0$ is determined by the maximum time required for demodulation which is basically the maximum bit period plus the maximum delay spread of the channel. Further shown is an adder 66 for obtaining the signal e. According to the present invention at least to a great extent all interference is cancelled simultaneously. For detecting weak users, similar multi-user receivers may be connected in series, indicated with the dashed blocks 68 and 69 connected in series. According to the present invention, the error signal e does not comprise strong rays anymore. Thus, weak users can easily be detected from the error signal e. In the given embodiment all processing is done by an ASIC (Application Specific Integrated Circuit) or by a DSP (Digital Signal Processor) or by a number of DSPs comprising ROM (Read Only Memory) and RAM (Random Access Memory). Such a DSP, well-known in the art per se, is not further shown in detail. Further, a decoder 67 is shown, which provides decoded data, e.g. speech data.

Figure 6:
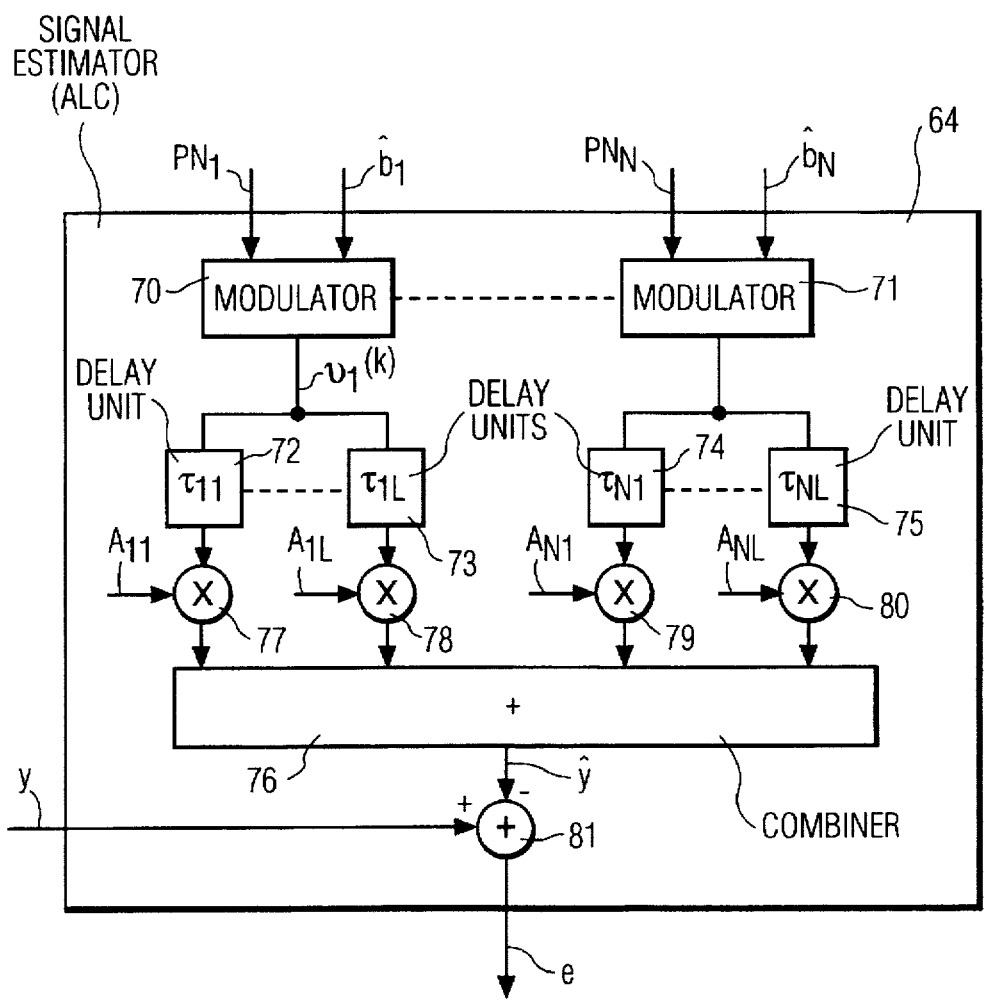
FIG. 6 shows an adaptive linear combiner according to the present invention for use in a CDMA receiver.

FIG. 6 shows an ALC (Adaptive Linear Combiner) as the received signal estimation means 64 according to the present invention for use in a CDMA receiver. The ALC 64 comprises re-spread and modulation means 70 and 71 for re-spreading the decision feedback bits $\hat{b}_1$ and $\hat{b}_N$ so as to obtain the signals $v_1(k)$ and $v_N(k)$ which are fed to delay units 72 and 73, and 74 and 75, respectively, representative of path delays $\tau_{11}, \ldots, \tau_{1L}$ and path delays $v_{N1}, \ldots, v_{NL}$, for L strongest paths for each of N channels. The signals $v_n(k)$, when superimposed, would give the received sampled signal y(k) when assuming no multipath fading. To include multipath fading, the signals $\tau$ are delayed with the path delays $\tau$ and weighted and phase shifted on the basis of the estimated complex amplitudes $A_{nl}$, n=1, ..., N, and l=1, ..., L, before addition by means of a combiner 76 so as to form the signal $\hat{y}$. In FIG. 6, further shown are complex multipliers 77, 78, 79, and 80, and a complex adder 81. The path delays are continuously acquired by the searchers as described in relation to FIG. 4. Newly estimated path are offered to the ALC 64. The ALC 64 determines whether to interchange paths or to disregard the new paths. Thus, the ALC 64 always chooses the strongest paths. For simplifying notation the computational feedback $k_0$ is assumed zero, i.e. in the sequel k is used instead of $k-k_0$. The ALC reflects a common baseband multi-user channel model, modelling L strongest rays for each of N users. The complex amplitudes $A_{nl}$ of the ALC 64 are updated jointly using an LMS (Least Mean Square) algorithm. This is a very practical choice as to implementation because it is a low complexity algorithm and exchanging, adding or removing of rays or users is very simple. The estimate $\hat{y}$ and the complex amplitudes $A_{nl}$ are updated according to:

$$\hat{y}(k)=\Sigma\Sigma A_{nl}(k)\cdot v_n(i\ k-\tau_{nl}), \text{whereby}$$

summation is over n=1, ..., N and l=1, ..., L, and, $$A_{nl}(k+1)=A_{nl}(k)+\mu\cdot v_n^*(k-\tau_{nl})\cdot e(k),$$

for n=1, ..., N, and l=1, ..., L. The symbol [108] denotes a complex conjugate operation. In the above formulas, $\mu$ is an adaptation step size of the LMS algorithm. In an embodiment, the LMS algorithm is run on the sampling rate. According to the present invention the complex amplitudes are estimated more accurately as compared to simplest correlation and averaging techniques, because interference is taken into account during a joint adaptation process. As a result, performance of the RAKE demodulators is increased.

Figure 7:
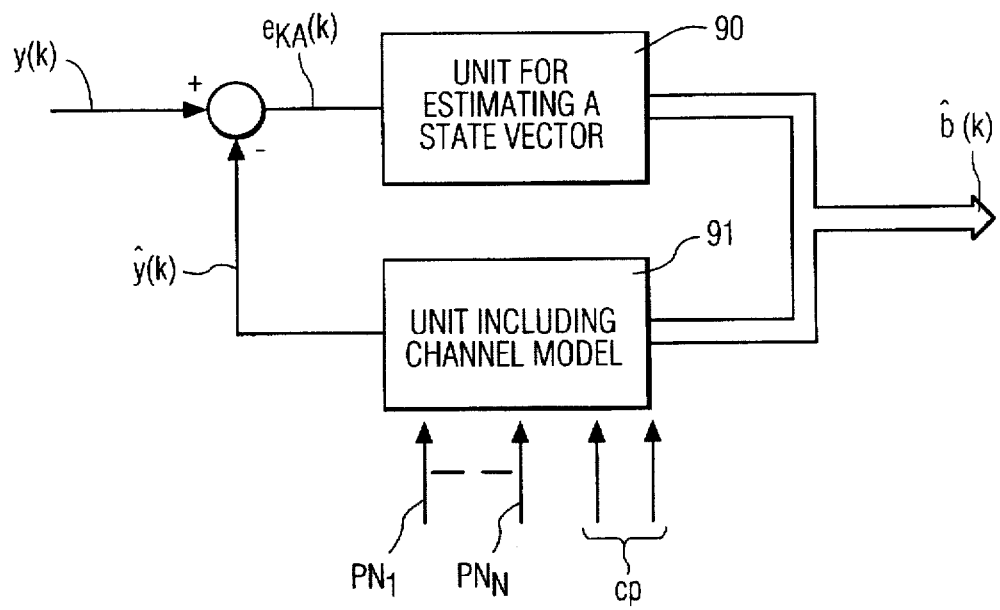
FIG. 7 shows a state-space multi-user detector as an alternative for the bank of RAKE demodulators.

FIG. 7 shows a state-space multi-user detector as an alternative for the bank of RAKE demodulators. The state space detector comprises means 90 for estimating a state vector, and a unit 91 comprising a channel model including re-spreading and modulation. A Kalman estimation error $e_{kA}(k)$ is inputted to the estimator 90. Inputs of the re-spreading unit 91 are the pseudo-noise sequences $PN_l$, ..., $PN_N$, and estimated channel parameters cp for N users, as described before. An output of the estimator is the signal $\hat{b}(k)$ comprising all transmitter bits of all N users influencing the received signal y(k) at time k. For a more detailed description of a state-space multi-user detector, referred is to the article "A State-Space Multiuser Detector for CDMA Systems", J. Thielecke, IEEE Int. Conf. on Comm., ICC 1993, Vol. 3, pp. 1762–1767. Also, a state-space multi-user detector is disclosed in the PCT Application WO 94/00116, filed by the same applicant on 20 May 1994, the contents of this application herewith being incorporated by reference.

Figure 8:
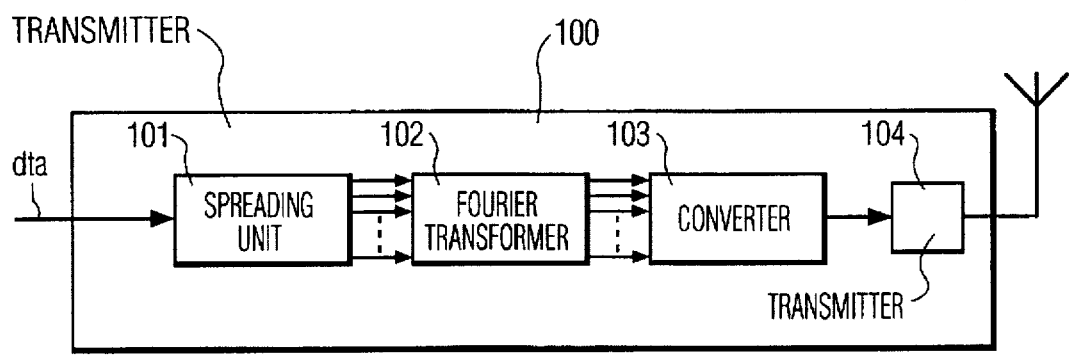
FIG. 8 shows a transmitter for use with a second embodiment of a CDMA receiver according to the present invention.

FIG. 8 shows a transmitter 100 for use with a second embodiment of a CDMA receiver according to the present invention, comprising a spreading unit 101 as described in relation to FIG. 1A and 1B, spreading the data dta with M chips per bit, M being an integer, and further comprising inverse Fourier transform means 102 acting upon the spread data, parallel-to-series conversion means 103 for obtaining a serial data stream from the inverse Fourier transformed chips, and transmit means 104 including a transmit filter. In such a transmitter 100, CDMA is combined with OFDM. In this case chips are obtained in the frequency domain. These chips, or bins in the frequency domain, can be distributed over the frequency domain such that a favourable transmission is achieved.

Figure 9:
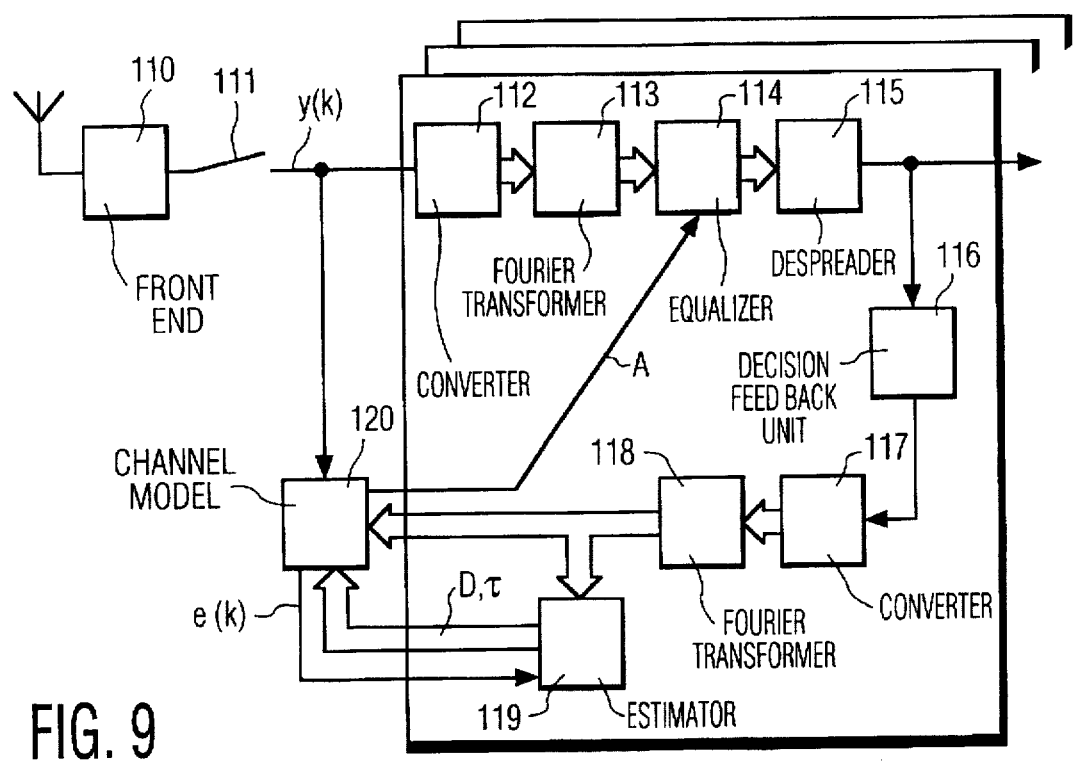
FIG. 9 shows a second embodiment of a CDMA receiver according to the present invention.

FIG. 9 shows a second embodiment of a CDMA receiver according to the present invention, comprising a receiver front end 110, sampling means 111, a serial-to-parallel converter 112, Fourier transform means 113, an equalizer 114, and despreading means 115, for N channels. Outputs of the despreading means are fed to a decoder, and to decision feedback means 116, as before. Decision feedback variables are re-spread, as before, and fed, after serial-to-parallel conversion in a serial-to-parallel converter 117, to inverse Fourier transform means 118. As before, also channel estimation means for estimating path delays 119, and a channel model 120 is provided. In this embodiment the multipath channel is equalized in the frequency domain. As in the first embodiment, the channel model operates in the time domain.

Figure 10:
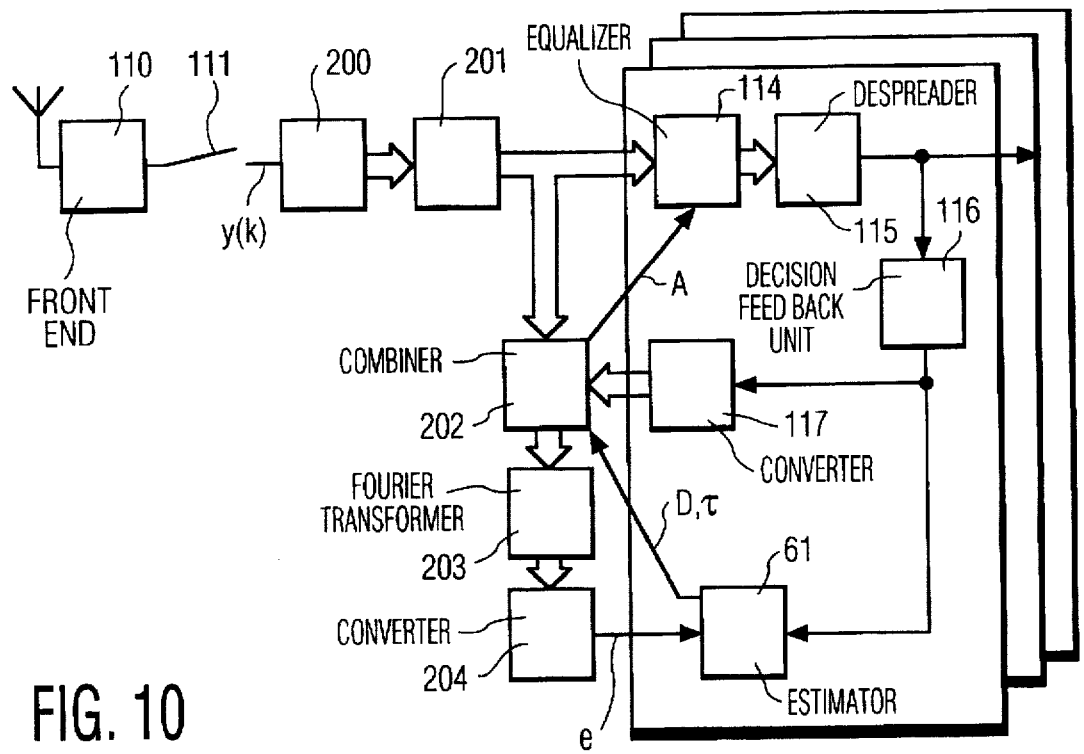
FIG. 10 shows a third embodiment of a CDMA receiver according to the present invention.

FIG. 10 shows a third embodiment of a CDMA receiver according to the present invention. This receiver is a modification of the receiver shown in FIG. 9. A serial-to-parallel converter 200, and Fourier transform means 201 are provided, common to the N channels. Furthermore, the receiver comprises an ALC 202, operating in the frequency domain, Fourier transform means 203 for Fourier transforming outputs of the ALC 202, so as to form the interference reduced signal e via parallel-to-serial converter means 204. When embodying the channel estimation means 61 for estimating path delays in the frequency domain, the Fourier transform means 203 and the parallel-to-serial converter means 204 can be dispensed with. Such an embodiment is useful when the users are synchronized with respect to each other, i.e. FFT-blocks of different users should be received synchronously, then.

We claim:

1. A multiple access digital transmission system comprising at least one transmitter for transmitting at least one modulated data stream, and at lest one receiver for receiving a transmitted signal, which comprises the modulated data streams, via a multipath transmission channel, the receiver comprising receiving means having resolving means for resolving at least one path for at least one multipath received modulated data stream, and having channel estimation means, which are coupled to the resolving means, for estimating channel path delays in the received modulated data streams, wherein the receiving means comprises generating means for generating an interference reduced signal from the received signal, the interference reduced signal being fed to the channel estimation means.

2. A multiple access digital transmission system according to claim 1, wherein the receiving means comprises received signal estimation means for estimating the received signal, and subtraction means for subtracting the estimated signal from the received signal so as to form the interference reduced signal, generation of the interference reduced signal being channel model based.

3. A multiple access digital transmission system according to claim 2, wherein an amplitude and a phase per resolved path is estimated, the estimated amplitudes and phases being fed to the received signal estimation means.

4. A multiple access digital transmission system according to claim 3, wherein the amplitude and the phase is recursively estimated.

5. A multiple access digital transmission system according to claim 2, wherein the received signal estimation means is an adaptive linear combiner.

6. A multiple access digital transmission system according to claim 1, wherein the resolving means is a RAKE demodulator.

7. A multiple access digital transmission system according to claim 1, wherein the resolving means is a joint multiuser detector.

8. A multiple access digital transmission system according to any one of the preceding claims, wherein at least two receiving means are cascaded, an input of a succeeding receiving means being coupled to an interference reduced signal output of a preceding receiving means, so as to successively detect stronger and weaker received modulated data stream.

9. A multiple access digital transmission system according to claim 1, wherein at transmission side, after spreading, an inverse Fourier transform is applied, and a reception side, before despreading, a Fourier transform is applied.

10. A radio base station for use in a multiple access digital transmission system, the radio base station comprising a receiver for receiving a signal, which comprises modulated data streams, transmitted via a multipath transmission channel, the receiver comprising receiving means having resolving means for resolving at least one path for at least one multipath received modulated data stream, and having first channel estimation means, which are coupled to the resolving means, for estimating channel path delays in the received modulated data streams, wherein the receiving means comprises generating means for generating an interference reduced signal from the received signal the interference reduced signal being fed to the channel estimation means.

11. A receiver for use in a multiple access digital transmission system, the receiver comprising receiving means for receiving a signal, which comprises modulated data streams, transmitted via a multipath transmission channel, the receiving means having resolving means for resolving at least one path for at least one multipath received modulated data stream, and having first channel estimation means, which are coupled to the resolving means, for estimating channel path delays in the received modulated data streams, wherein the receiving means comprises generating means for generating an interference reduced signal from the received signal, the interference reduced signal being fed to the channel estimation means.

* * * * *